United States Patent [19]
Gilsinger

[11] 3,760,919
[45] Sept. 25, 1973

[54] POSITIVE CLUTCH WITH DUAL RELEASING CAMS

[75] Inventor: Frederick M. Gilsinger, Highland, Ind.

[73] Assignee: Simmons Company, New York, N.Y.

[22] Filed: Mar. 6, 1972

[21] Appl. No.: 232,105

[52] U.S. Cl............... 192/89 A, 192/71, 192/79, 192/108
[51] Int. Cl............................................ F16d 11/12
[58] Field of Search................. 192/89 A, 71, 79, 192/93 B, 108

[56] References Cited
UNITED STATES PATENTS
| | | | |
|---|---|---|---|
| 603,840 | 5/1898 | Endter | 192/93 B X |
| 2,208,807 | 7/1940 | Weiher | 192/71 X |
| 2,846,039 | 8/1958 | Regua et al. | 192/71 |

FOREIGN PATENTS OR APPLICATIONS
| | | | |
|---|---|---|---|
| 113,060 | 3/1899 | Germany | 192/75 |
| 1,025,999 | 1/1953 | France | 192/71 |

Primary Examiner—Benjamin W. Wyche
Attorney—William E. Anderson et al.

[57] ABSTRACT

A clutch operable by very light control force and having as its driver a hub with opposed lugs and as its driven member a block mounting opposed pivoted dogs urged by springs into position to engage the opposed lugs of the driver and having a finger following a cam spool on the driving shaft to disengage the dogs from the lugs by the axial shifting of the spool on the driving shaft.

5 Claims, 8 Drawing Figures

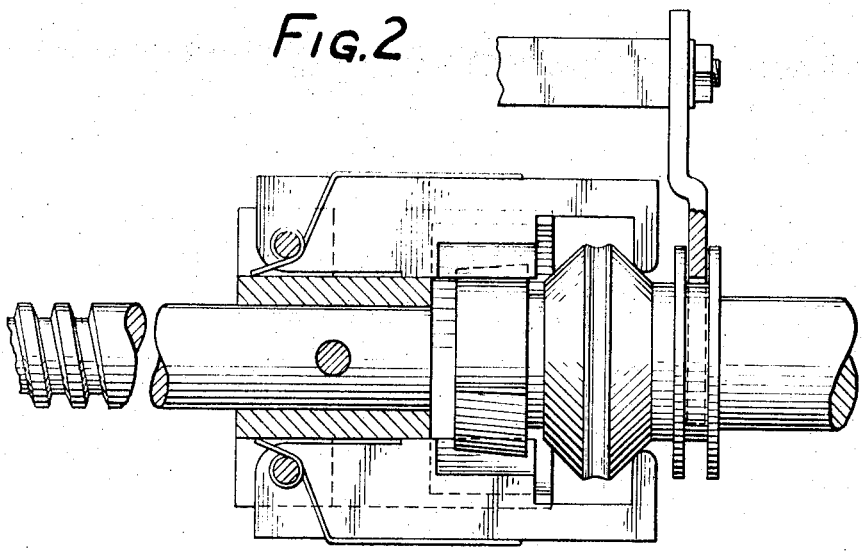
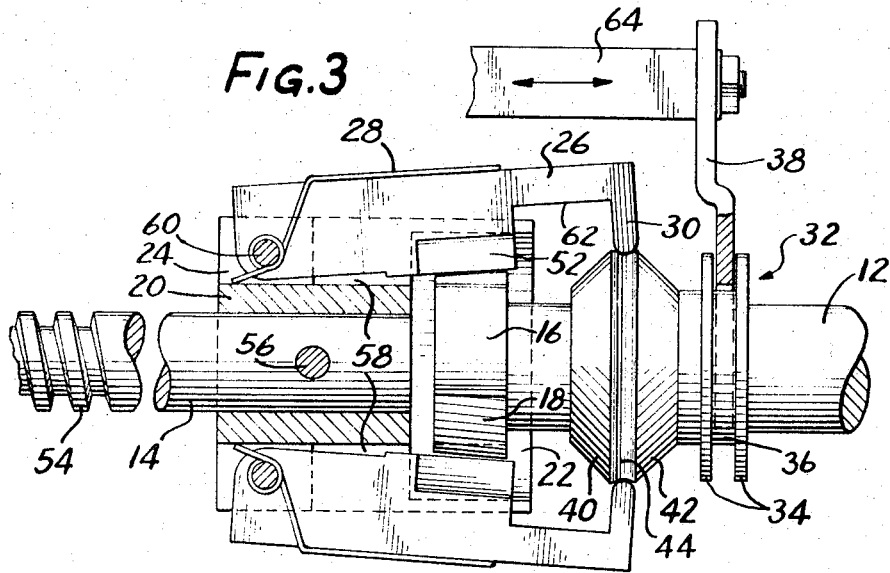
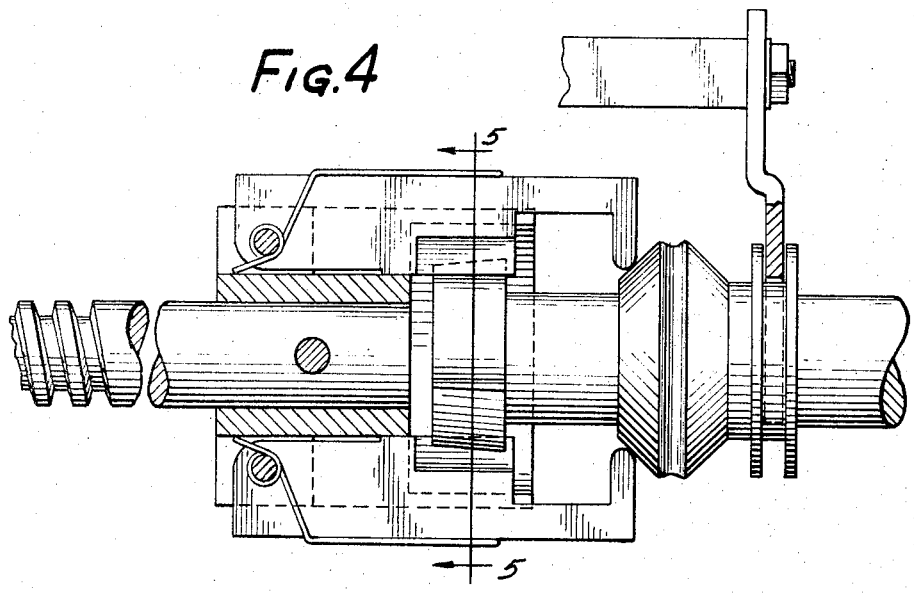

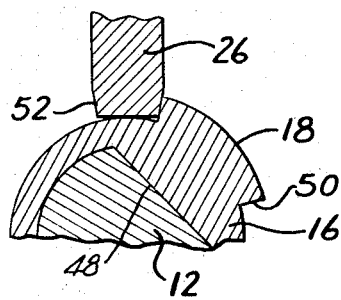
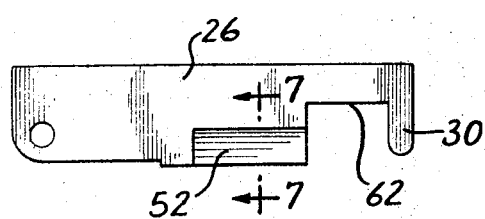
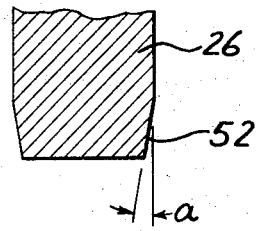
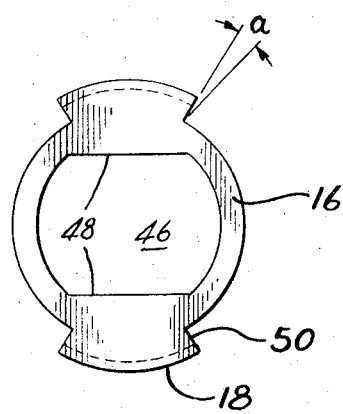

POSITIVE CLUTCH WITH DUAL RELEASING CAMS

This invention relates to clutches for coupling two axially aligned shafts in driving relation, and particularly to a clutch engageable by movement of a control element in either of two opposite directions from a neutral position, and capable also of ease of positive engagement and disengagement, as well as of the transmission of torque equally in either direction of rotation of the driving member.

The clutch which is the subject matter hereof was developed for use in a power-operated hospital bed, i.e., for the selective application of power from a driving motor to one of a plurality of screws connected to effect the several adjustments of elevation and configuration required of the patient-supporting surface. The rotational speeds in such application are not very great, being of the order 120 r.p.m., and the torque to be transmitted under the most severe conditions of load is of the order of 70 inch-pounds. Speed and power are obviously therefore not of the essence in such application but, the control requirements dictated by the application are exacting. Specifically, the economics of safe use of hospital beds, especially the prevention of sparking in or adjacent to an oxygen-enriched environment, favor patient control of power-operated functions by the use of mechanical controls for transmitting the patient's command from a control station within reach of the patient at the side of the bed to the necessary electrical switch gear, and to the function-selecting clutches, customarily located for safety reasons near the foot of the bed, i.e., as far as possible from oxygen tents or other oxygen administrating apparatus.

The necessity, however, of designing unamplified controls for operation by enfeebled and mechanically inept persons dictates the employment of a single but separate controller for each function placed at the patient's disposal, and a control format that contemplates a control movement in one direction for desired adjustment in a given direction and a control movement in the opposite direction for return. Within that control scheme, the force necessary to administer the control command must be a very small force, viz., of the order that can be applied with either the thumb or forefinger by an elderly female patient with her hand groping unseeingly over the side of the bed.

It is the object, therefore, of this invention to provide a mechanically controllable clutch capable of engagement and disengagement by a simple and light movement of a control linkage in either direction, and toward and away from a neutral position. It is a further object to provide a low speed, relatively low torque, selectively operable clutch coupling of a nature such that its engagement and its disengagement, although requiring little control force, are both positive and quiet, and do not make the staccato "ratcheting" noise that typically accompanies jaw clutches that are adjusted for engagement and disengagement by control movements capable only of relatively low force.

The clutch of this invention will be understood from the following description taken in conjunction with the accompanying drawings in which:

FIGS. 2, 3 and 4 are each partially sectional elevational views of the clutch in assembled relation, showing the clutch respectively engaged by a control movement in one direction, disengaged by the placement of the actuator in "neutral," and again engaged by a control movement in the opposite direction;

FIG. 5 is a sectional view of the driving and driven member in engaged position taken on the line 5—5 of FIG.4;

FIGS. 6 and 7 are elevational and cross sectional views, respectively, of the engaging dog of the driven member, the sectional view being taken along the line 7—7 of FIG. 6; and FIG. 8 is a front elevational view of the driving member per se.

Figure 1:
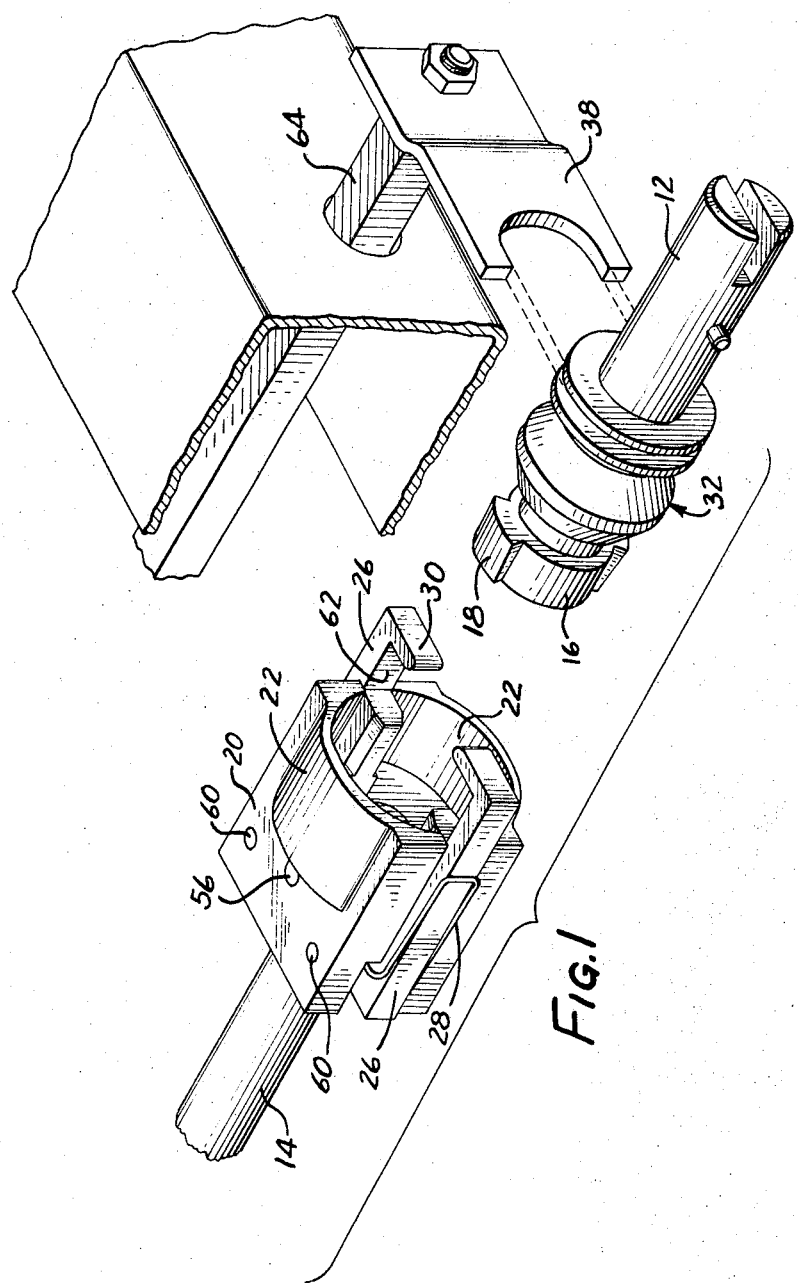
FIG. 1 is an "exploded" isometric assembly drawing showing the driving clutch part withdrawn from, but coaxial with, the driven part, and also coaxially therewith the clutch actuator, and to one side the clutch shifting fork.

For a brief functional and structural summary of the clutch 10 of this invention, it may be noted that the driving shaft 12 and the driven shaft 14 are disposed in nearly abutting coaxial alignment, and that the driving shaft 12 carries at its end a driving member 16 comprising a hub having a pair of opposed radially projecting bosses or lugs 18 whose outer or peripheral surfaces are conical about the axis of rotation. The driven member 20 is pinned for rotation with the driven shaft 14, in this case a screw, and comprises a block of metal having at its end facing the driving member 16 a skirt or bell 22 to enshroud the driving member as a guard, and having seated in opposed longitudinal slots 24 formed therein a pair of pivoted dogs 26 biased by hairpin torsion springs 28 for pivotal movement inwardly to engage the aforementioned bosses 18 of the driving member. The clutch dogs 26 extend axially beyond the driving member 16 to provide follower fingers 30 directed inwardly for engagement by a clutch actuator 32.

The clutch actuator 32 may be described as a spool having a free, non-driving slip fit with the driving shaft 12 and a pair of spaced flanges 34 which between them define a groove 36 to receive a clutch shifting fork 38. At the end of the spool adjacent the driving member of the clutch, a pair of conical surfaces 40 and 42 are arranged back-to-back with their major diameters flanking an intermediate dwell surface 44 which is slightly grooved peripherally to form a stable seat for the clutch dog fingers 30 in neutral position. As will be apparent from inspection of FIGS. 2, 3 and 4, arranged one below the other for ready comparison, movement of the actuator spool 32 a short distance in either axial direction from neutral permits the clutch dogs 26 to swing inwardly for driving engagement by the bosses 18 of the driving member 16, under the force of the hairpin springs 28.

Conversely, return of the actuator spool 32 to midposition cams the clutch dog fingers 30 up the conical slopes of the actuator spool and into the grooved dwell or neutral position 44, thus raising the engaging faces of the clutch dogs 26 from the driving faces of the driving member 16.

Upon examining the structure in more detail, it will be noticed that the central hole 46 in the driving member 16 is essentially cylindrical for ease of centering on the driving shaft 12, but that the cylindrical hole is provided with opposed chordal segments 48 which match opposed flats milled on the end of the driving shaft 12 to secure the two in driving relation. The driving member 16 is essentially cylindrical but the two diametrically opposed, outwardly projecting bosses 18 have peripheral surfaces which are conical about the axis of the driving member, with an apical angle of about 9° in the present instance. As will be appreciated by comparison of FIGS. 2 and 3, the angle is determined by the swing of the pivoted clutch dog 26, a clearance of some 0.015 inches between the clutch dog and the conical outer surface of the boss 18 of the driving member having been found satisfactory to ensure adequate compensation for machining and assembling tolerances to prevent contact between the driving and driven parts in the disengaged or neutral position.

The side or engaging faces 50 of each of the two bosses 18 are not radial, but make an angle with respect to a radial-axial plane determined by the width of the dog 26 and the radius of the hub 16. The faces 50 are accordingly undercut somewhat and the driving engagement thus tends to maintain itself. To reduce the resistance to disengagement, the angle of engagement of the faces 50 and 52 is accordingly relieved by chamfering the dogs 26 from the plane of the side surfaces of the clutch dog as at 52, and relieving the angle of the faces 50 of the lugs 18 appropriately to provide for plane-to-plane engagement of the driving and driven members. The angle "a" of this relief is determined empirically and is dictated at least in part by the finish of, and therefore the frictional resistance to disengagement of, the mating surfaces 50 and 52 of the driving member and the driven dog. The appearance of the driving member in drawings, therefore, as having its engaging faces 50 disposed radially is illusory; those surfaces may or may not be radial depending upon the thickness of the dog 26 and the amount of relief determined to be necessary to facilitate the disengagement of the surfaces in contact, particularly as the contact pressure between the engaged surfaces 50 and 52 increases as disengagement proceeds, although power to the driving motor will preferably be interrupted simultaneously with or just prior to disengagement.

The driven member 20 comprises a block of metal having a central hole to receive the driven shaft 14, in this application having formed thereon formed thereon an Acme screw thread 54, and the driven member 20 and the driven shaft 14 being locked in driving relation by a suitable tapered drive pin 56. Formed in the face of the driven member 20 is the bell or skirt 22 which encloses the rotating driving member 16 as a guard when the clutch is both engaged and disengaged, and the pair of diametrically opposed longitudinally extending grooves 24 which receive the clutch dogs 26 extend throughout the axial length of the driven member, including the bell 22.

The clutch dogs 26 serve as swinging keys. They are formed as a relatively thick bar, basically rectangular in cross section and dimensioned to fit closely within the longitudinal grooves 24 of the driven member along the mid-portions 58 of those grooves. Each is pivoted on a drive pin 60 which spans the seating groove 24 from side to side, the pin being encircled by the loops of the hairpin torsion spring 28 which bears against the outer edge of the dog 26 to urge it into driving engagement with the driving member 16. When so engaged, the driving force is transmitted from the driving member 16 to the clutch dog 26 and in turn by the engagement of the side surface of the clutch dog with the mid-portions 58 of the side walls of the longitudinal grooves of the driven member 20, and in turn to the driven shaft 14 through the drive pin 56.

As indicated in the assembly drawings, FIGS. 2 to 4, the clutch dogs 26 extend beyond the driving member 16 and are notched or recessed on their inner edges as at 62 to provide the terminal finger or follower 30 which engages the clutch actuator spool 32. The recesses 62 are long enough axially to span the clutch actuator cams 40 and 42 when the clutch is engaged by movement of the actuator to the left as viewed in FIG. 2. The finger 30 at the end of the driven dog is rounded to provide for easy camming engagement with either of the conical surfaces 40 and 42 of the actuator spool, as well as to assist in providing a stable neutral position by riding in the grooved "dwell" 44 between the two conical camming surfaces.

The actuator spool 32 requires no further detailed explanation beyond that given in the earlier summary except to note that an angle of approximately 45° has been found a suitable angle for the conical surfaces 40 and 42, which are case hardened and polished, preferably to a finish of about 8 microns, so as not to inhibit the clutch disengaging movement unnecessarily. Similarly, the interior surface of the actuator spool and the exterior surface of the driving shaft along which it slides are likewise provided with a ground finish of approximately 30 microns to eliminate unnecessary drag during the control movement. The actuator spool 32, as earlier indicated, is shifted axially of the driving shaft by a clutch shifting fork 38 confined between flanges of the actuator spool. The clutch shifting fork may, as indicated, be formed of sheet metal in the form of a strap or thin bar extending laterally from the end of an actuator rod or link 64 to which it is secured by means of a screw, the fork being formed therein as a semicircular seat (FIG. 1) adapted to partially encircle the actuator spool in the groove 36 between the flanges.

Because of the rather intricate shapes of the driving member 16, the driven dog 26, and especially the driven member 20 of the clutch, all three parts are preferably made of powdered metal in preference to fabrication by conventional machining. The finish and the tolerances attainable by this process are entirely satisfactory for the application and the cost of manufacture in production quantities somewhat less than conventional machining. The clutch actuator spool on the other hand, its outer shape consisting entirely of surfaces of rotation and because of the hardening and grinding of its active surfaces, is manufactured as a screw machine part.

With the above described clutch, the control force necessary to engage and disengage the clutch is relatively light and easily supplied through a mechanical linkage operable by the limited force and movement available from the fingers of an elderly or otherwise enfeebled patient. Engagement is positive and the noise of engagement is slight, without the repetitive "ratcheting" sometimes experienced with more conventional jaw type clutches.

The features of the invention believed patentable are set forth in the appended claims:

What is claimed is:

1. A clutch for use in power-operated hospital beds and like service for selectively coupling two aligned shafts in driving engagement comprising a driving member fixed near the end of one of the shafts for rotation thereby and comprising a hub having at least a pair of opposed radially projecting lugs, a driven member fixed near the end of the other shaft in facing relation to said driving member, a pair of opposed clutch dogs pivoted to the driven member on axes transverse of the rotational axis and swingable thereon in planes radial to said driving member from an engaged position at which the dogs intercept the lugs of the driving member, and a disengaged position at which the said lugs rotate freely without striking the dogs, spring means urging said dogs inwardly to intercept said lugs, an actuator on said driving shaft shiftable axially thereof and having a pair of opposed axially spaced cam surfaces which are separated by an intervening dwell surface, each of said dogs having a follower finger adapted to follow said cam surfaces and said dwell surface of said actuator as the same is shifted axially of said driving shaft thereby to effect engagement of the clutch dogs with said driving lugs and to effect disengagement thereof when said follower fingers are located at said intervening dwell surface, and means for shifting said actuator axially of said driving shaft.

2. A clutch in accordance with claim 1 wherein said opposite cam surfaces are each frustoconical surfaces coaxial with said axis of rotation and disposed with the major diameters thereof flanking said intervening dwell surface.

3. A clutch in accordance with claim 2 wherein the radially outermost surfaces of said lugs are sections of the frustum of a cone coaxial with said axis of rotation, the smaller diameter edge of said lug surfaces being disposed adjacent said end of said one shaft.

4. A clutch in accordance with claim 1 wherein said intermediate dwell surface is a concave peripheral groove and wherein portions of said follower fingers are rounded so as to be generally received by said concave groove.

5. The clutch in accordance with claim 1 wherein said dogs are bar members lying generally parallel to said axis of rotation when engaged with said lugs of the driving member, and wherein said dogs are provided with recesses at locations between their zones of engagement with said lugs and said follower fingers, which recesses are proportioned to provide clearance for said actuator and allow said dogs to span said cam surfaces of said actuator when said actuator is shifted axially toward said driven member to engage said clutch.

* * * * *